United States Patent
Ramesh et al.

(10) Patent No.: US 8,812,690 B1
(45) Date of Patent: Aug. 19, 2014

(54) METHOD AND SYSTEM TO PROVIDE REPUTATION SCORES FOR A SOCIAL NETWORK MEMBER

(71) Applicant: LinkedIn Corporation, Mountain View, CA (US)

(72) Inventors: Ganesh Ramesh, Cupertino, CA (US); Ramakrishna Vemuri, Fremont, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/947,866

(22) Filed: Jul. 22, 2013

(51) Int. Cl.
*G06F 15/16* (2006.01)
*G06F 15/173* (2006.01)
*G06Q 99/00* (2006.01)

(52) U.S. Cl.
USPC .............................. 709/227; 709/224; 705/319

(58) Field of Classification Search
USPC ............................ 709/223, 224, 227; 705/319
See application file for complete search history.

(56) References Cited

U.S. PATENT DOCUMENTS

| | | | |
|---|---|---|---|
| 8,478,662 B1 * | 7/2013 | Snodgrass et al. | 705/26.7 |
| 2004/0039814 A1 * | 2/2004 | Crabtree et al. | 709/224 |
| 2009/0265639 A1 * | 10/2009 | Shuster | 715/747 |
| 2009/0306996 A1 * | 12/2009 | Tsaparas et al. | 705/1 |
| 2011/0066605 A1 * | 3/2011 | Elbaz | 707/705 |
| 2012/0166285 A1 * | 6/2012 | Shapiro et al. | 705/14.58 |

* cited by examiner

*Primary Examiner* — Brian J Gillis
(74) *Attorney, Agent, or Firm* — Schwegman, Lundberg & Woessner, P.A.

(57) ABSTRACT

A method and system to provide reputation scores for a social network member is described. An example system comprises an access module, a unit score generator, and a combined reputation score generator. The access module accesses a member profile, and the unit score generator generates reputation scores for one or more units of the member profile. The member profile represents a member of an on-line social network. The combined reputation score generator generates a combined reputation score for the member profile based on the respective reputation scores for the one or more profile units.

18 Claims, 5 Drawing Sheets

METHOD AND SYSTEM TO PROVIDE REPUTATION SCORES FOR A SOCIAL NETWORK MEMBER

TECHNICAL FIELD

This application relates to the technical fields of software and/or hardware technology and, in one example embodiment, to system and method to provide reputation scores for a social network member.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to generate reputation scores for the profiles of members in a social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Reputation scores may be computed based on information obtained from trusted sources, such as patent databases, publications databases, or even enterprise contracts. Connections are used to infer or extrapolate reputation scores of members that are connected to a member whose reputation score is known. For instance a member would be assigned a high score for their experience at a well-known company if 100 of their 150 connections have an overlap on their profile for working at the same company and 10 of them have confirmed email addresses. Members who are connected in the context of a social network may be termed each other's connections.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information provided by the member's connections. Information provided by the member's connections may be, e.g., recommendations, endorsements and skills. The profile of a member may include several items or units of a profile (also termed profile units). For example one unit of a profile may contain information about the member's education, while another unit may contain information about the member's current and past employment.

Method and system are described for generating reputation scores for member profiles in the context of an on-line social network. According to one example embodiment, the data contained in and associated with a member profile may be examined and processed to generate a value that may be viewed as indicative of a reputation of the associated member.

Such a value may be referred to as a reputation score and may be made available to other members of the on-line social network.

A reputation score may be indicative of the member's professional and/or academic reputation and may be represented by a numerical value, e.g., a number between 1 and 10. Another way to represent reputation may be utilizing a color scheme. For example, green may indicate "high confidence of the accuracy of the profile information," yellow as "might need more checking," and gray for "not known." A reputation score may also be associated with a confidence value. A confidence value may be calculated to represent the certainty level of the reputation score being an accurate representation of the member's professional reputation in the context of the social network.

In one example embodiment, in order to generate the reputation score for a member profile, the system for generating reputation scores may first define or select a profile unit that can be scored. Once defined, information associated with the profile unit is collected and provided to a score generator model. A score generator model may be viewed as a computer-implemented module that takes certain information as input, processes it by applying rules and/or machine learning techniques, and generates an output that can be utilized by other computer-implemented modules or stored in a repository for future access. Some examples of data that may be used to score a profile unit of a member include the following. (1) Confirmed email address of the member. (2) Connections of the member, whose respective profiles indicate the connections having worked at the same company as the member during the same time period. (3) Proportion of connections of the member that are associated with one specific company, as compared to the total number of connections of the member. (4) Publications referenced in the profile of the member, where the name of the publication is found in a public database.

A system for generating reputation scores for member profiles may be provided with a different score generator model for different units of a member profile (unit score models for generating unit scores), as well as with a separate score generator model for generating a score for the entire member profile (a combined reputation score model). A combined reputation score model, in one embodiment, may utilize the profile information of a member together with respective scores of various profile units to generate an overall reputation score of the member profile.

For example, a profile of a member may include information regarding the member's education and professional experience. The part of the profile that contains information regarding the member's education may be designated as a profile unit, for which a reputation score can be generated. Another profile unit, for which a reputation score may be generated, may be the part of the profile that contains information regarding the member's professional experience. Each of these two scores may be processed by respective score generator models. An associated model may analyze information contained in the profile unit related to the member's education and assign a higher or a lower score to this profile unit based, e.g., on the number and the quality of the members' degrees, on the number of years of college completed, etc. A different model may be used to evaluate the profile unit related to the member's professional experience and assign a higher or a lower score to this profile unit based, e.g., on the number of years in an industry, on the positions held by the member at various companies, etc. The reputation score of a member may also be affected by reputation scores of the member's connections and by any recommendations and endorsements provided by the member's connections, as well as by the completeness of the member's profile.

In some embodiments, a system for generating reputation scores may also be configured to provide a certification of the entire profile or of a portion of the profile, by assigning confidence values to different part of the profile. A confidence value may be generated based on examining and verifying that the verifiable information, such as, e.g., the member's academic degrees, past and current employment information, is accurate.

In one example embodiment, member profiles of certain members may be selected as so-called seed profiles. A seed profile is a profile of a member who is well known in their field of expertise, and whose credentials and professional accomplishments are well known and/or easily verifiable. The reputation scores of the seed profiles may be computed based on the profile information that can be verified as well based on the publically available information, such as, e.g., the publications and awards of the member represented by the seed profile. Once the information associated with a member represented by a seed profile is verified, the reputation score of the seed profile is associated with a high (or the highest) confidence value. A seed profile may also be tagged with an indication of it being a seed profile in that the information associated with this profile is to carry higher weight in determining reputation scores of other member profiles.

In generating a reputation score of a member profile, the system may utilize so-called association information related to a seed profile. Association information reflects association between a member profile and a seed profile. Association information may include the number of connections that a member profile has in common with a seed profile, recommendations or endorsements originated from a seed profile with respect to a member profile, recommendations or endorsements of a member profile by members represented by profiles that are connections of a seed profile, etc. For example, in one embodiment, a recommendation of a member profile by a member represented by a seed profile may be used to increase the reputation score of the member profile. The reputation score of a member profile may also be increased based on recommendations or endorsements by members who are common connections between the member profile and a seed profile, but in a lesser degree as compared to when the endorsement originates directly from a seed profile.

The profiles of the members of an on-line social network may differ significantly, e.g., in terms areas of professional pursuit, education, seniority in the field, as well as the completeness of the profile. For example, one member may be a CEO having decades of experience in the industry, while another member may be a student. In order to put all member profiles on equal footing, the scored member profiles are normalized across all profiles in the on-line social network.

One or more member profiles in an on-line social network may be identified as spam by a spam filtering system. A spam filtering system may be configured to associate a spam score with a member profile. Data from the spam filtering system, such as a spam score, may be utilized in computing reputation scores for member profiles. For example, the reputation score for a member profile may be decreased or down-weighted based on the spam score.

The reputation score and the confidence value generated for a member profile may be presented to the member and may also be made available to other members of the on-line social network. Reputation scores may be used by recruiters to identify and rank job candidates. For example, if a company needs to verify a potential employee's profile by checking whether the information available in the profile is accurate, the system for generating reputation scores may be utilized to provide guidance as to what parts of the profile needs verification by using the confidence values of information in the profile. In another example, when a recruiter product is ranking job candidates, the reputation scores of the candidates may be used to rank the candidates. When employee verification needs to be done before a person is to join a company, the reputation scores for various units in the profile can be used to find those parts of the person's member profile that need to be verified. Search results for members having certain qualifications can be ranked based on the reputation scores. In one embodiment, a system for generating reputation scores may also be configured to make a recommendation of which parts of a member profile may need further verification or authentication.

Figure 1:
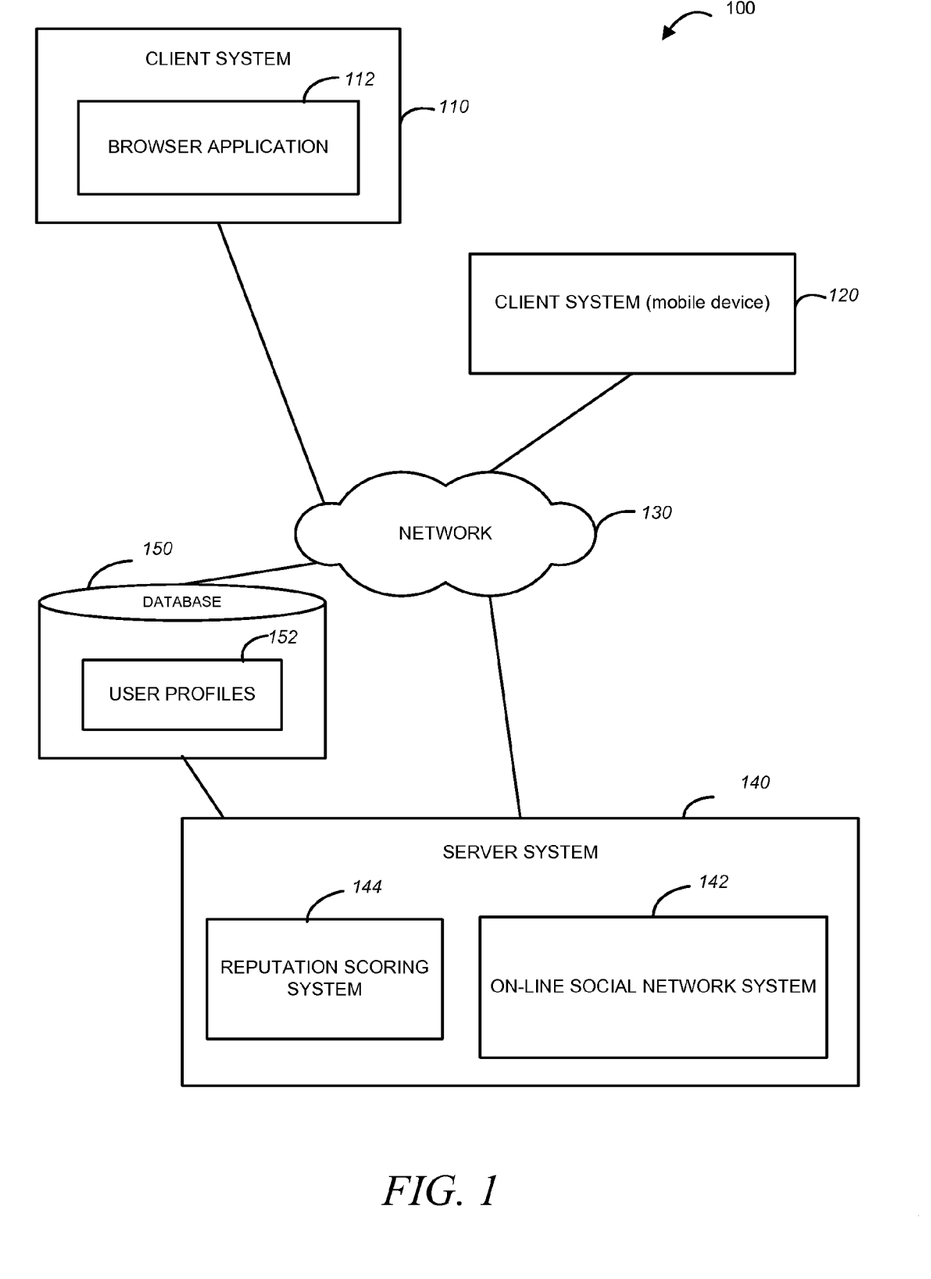
FIG. 1 is a diagrammatic representation of a network environment within which an example method and system to provide reputation scores for a social network member may be implemented.

An example method and system for generating reputation scores for a social network member may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as profiles 152.

The client systems 110 and 120 may be permitted to access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a reputation scoring system 144. In one example embodiment, the reputation scoring system 144 is configured to examine profile information of a member and generate a reputation score for the entire member profile and/or for one or more units of a member profile. The reputation scoring system 142 may also be configured to associate a confidence value with a reputation score based, e.g., on the results of verifying information contained in or associated with the member profile. For example, if a member indicated that they have earned a master's degree from a particular university, the veracity of this information may be verified and the result of this verification may be used in computing a confidence value to be associated with a reputation score of that member's profile. An example reputation scoring system 142 is illustrated in FIG. 2.

Figure 2:
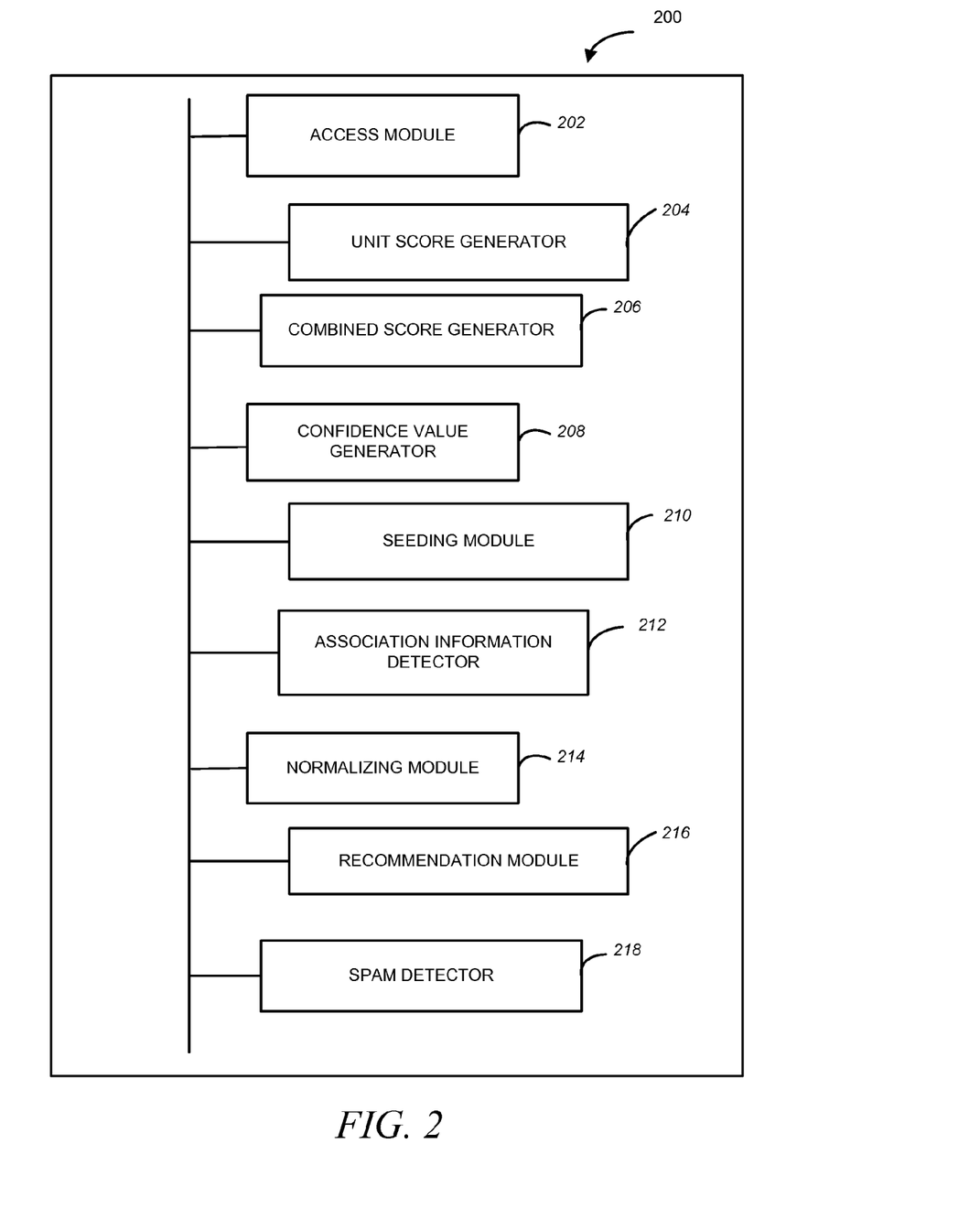
FIG. 2 is block diagram of a system to provide reputation scores for a social network member, in accordance with one example embodiment.

FIG. 2 is a block diagram of a system 200 to generate reputation scores for members of an on-line social network, in accordance with one example embodiment. As shown in FIG. 2, the system 200 includes an access module 202, a unit score generator 204, a combined reputation score generator 206, and a confidence value generator 208. The access module 202 may be configured to access member profiles in an on-line social network. An on-line social network may be provided e.g., by the server system 140 hosting the social network system 142 (shown in FIG. 1). As explained above, a member profile represents a member of an on-line social network and may be viewed as comprising a plurality of profile units dedicated to storing information associated with respective themes, such as education, professional experience, publications, etc. The unit score generator 204 may be configured to generate respective unit scores for one or more profile units from the profile of the member. The unit score generator 204 may include a plurality of score generator models, where a different score generator model is provided for different units of a member profile. For example, one unit score generator model may be configured to process information associated with the profile unit containing the member's education information, while another unit score generator model may be configured to process information associated with the profile unit containing the member's professional experience information. The combined reputation score generator 206 may be configured to generate a combined reputation score based on the respective unit scores for the one or more profile units. A combined reputation score generated for a certain member profile may be treated as indicative of the reputation of the associated member of the on-line social networking system.

The confidence value generator 208 may be configured to generate a confidence value for the combined reputation score, the confidence value reflecting results of verifying verifiable information form the member profile. As explained above, a confidence value may be generated as the result of examining and verifying information in the member profile, such as, e.g., the member's academic degrees and past and current employment information. The confidence value generator 208 may also take into consideration the completeness of the member profile in calculating a confidence value.

Also shown in FIG. 2, are a seeding module 210 and an association information detector 212. The seeding module 210 may be configured to select one or more so-called seed profiles from member profiles in the on-line social networking system. As explained above, a seed profile is a profile of a member who is well known in their field of expertise, and whose credentials and professional accomplishments are well known and/or easily verifiable. For example, a member profile may be selected as a seed profile when the reputation score of this profile can be associated with a high confidence value, e.g., where a confidence value of the reputation score is above a predetermined threshold. A seed profile may also be tagged with an indication of it being a seed profile in that the information associated with this profile is to carry higher weight in determining reputation scores of other member profiles.

The combined reputation score generator 206, in one example embodiment, may be configured to utilize so-called association information related to a seed profile. Association information may be determined by the association information detector 212. It reflects association between the member profile and the seed profile. For example, association information may reflect an activity, within the on-line social networking system, that is directed to a member profile and is also associated with the seed profile. Such activity may be a direct activity, where the activity is performed from the seed profile and affects the member profile. A direct activity may be, e.g., a member represented by a seed profile endorsing another member. An activity affecting a member's reputation score may also be an indirect activity associated with a seed profile. An indirect activity is an activity performed from a profile that is connected to the seed profile and directed at the member profile. An indirect activity may be, for example, a recommendation from a member profile that is connected to a seed profile.

Also shown in FIG. 2, are a normalizing module 214, a recommendation module 216, and a spam detector 218. The normalizing module 214 may be configured to normalize the combined reputation score across all profiles from the on-line social networking system. The recommendation module 216 may be configured to determine that a member profile may lack in completeness and provide a recommendation that the member adds information inter their member profile. The spam detector 218 may be configured to detect that a member profile is spam. An indication of spam may be propagated as a signal to lower reputation scores of connected members. Spam may be detected by the spam detector 218 in several different ways, including detecting that a member is posting links of known spam sites, posting content deemed to be spam based on certain keywords and phrases, or detecting divergence from typical member behavior.

Figure 3:
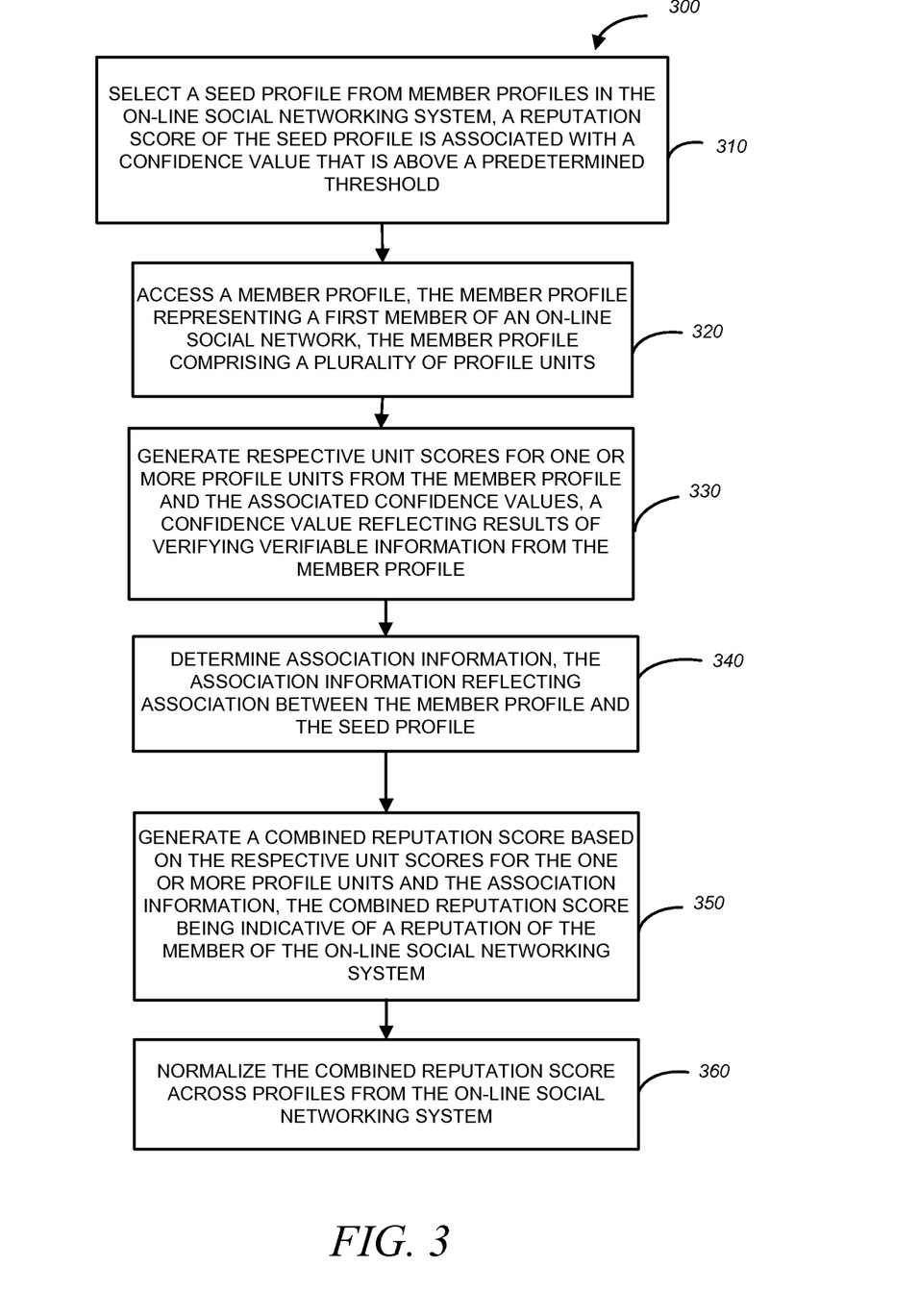
FIG. 3 is a flow chart of a method to provide reputation scores for a social network member, in accordance with an example embodiment.

FIG. 3 is a flow chart of a method 300 to generate reputation scores for members of an on-line social network, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the seeding module 210 selects one or more so-called seed profiles from member profiles in the on-line social networking system. A reputation score of a seed profile is associated with a confidence value that is above a predetermined threshold. At operation 320, the access module 202 accesses a member profile in an on-line social network. At operation 330, the unit score generator 204 generates respective unit scores for one or more profile units from the member profile and the confidence value generator 208 generates respective confidence values. The confidence values reflect the results of verifying verifiable information from the member profile. The association information detector 212 determines association information at operation 340. Association information reflects association between the member profile and the seed profile.

At operation 350, the combined reputation score generator 206 generates a combined reputation score based on the respective unit scores for the one or more profile units. A combined reputation score generated for a certain member profile may be treated as indicative of the reputation of the associated member of the on-line social networking system. At operation 360, the normalizing module 214 normalizes the combined reputation score across all profiles from the on-line social networking system.

Figure 4:
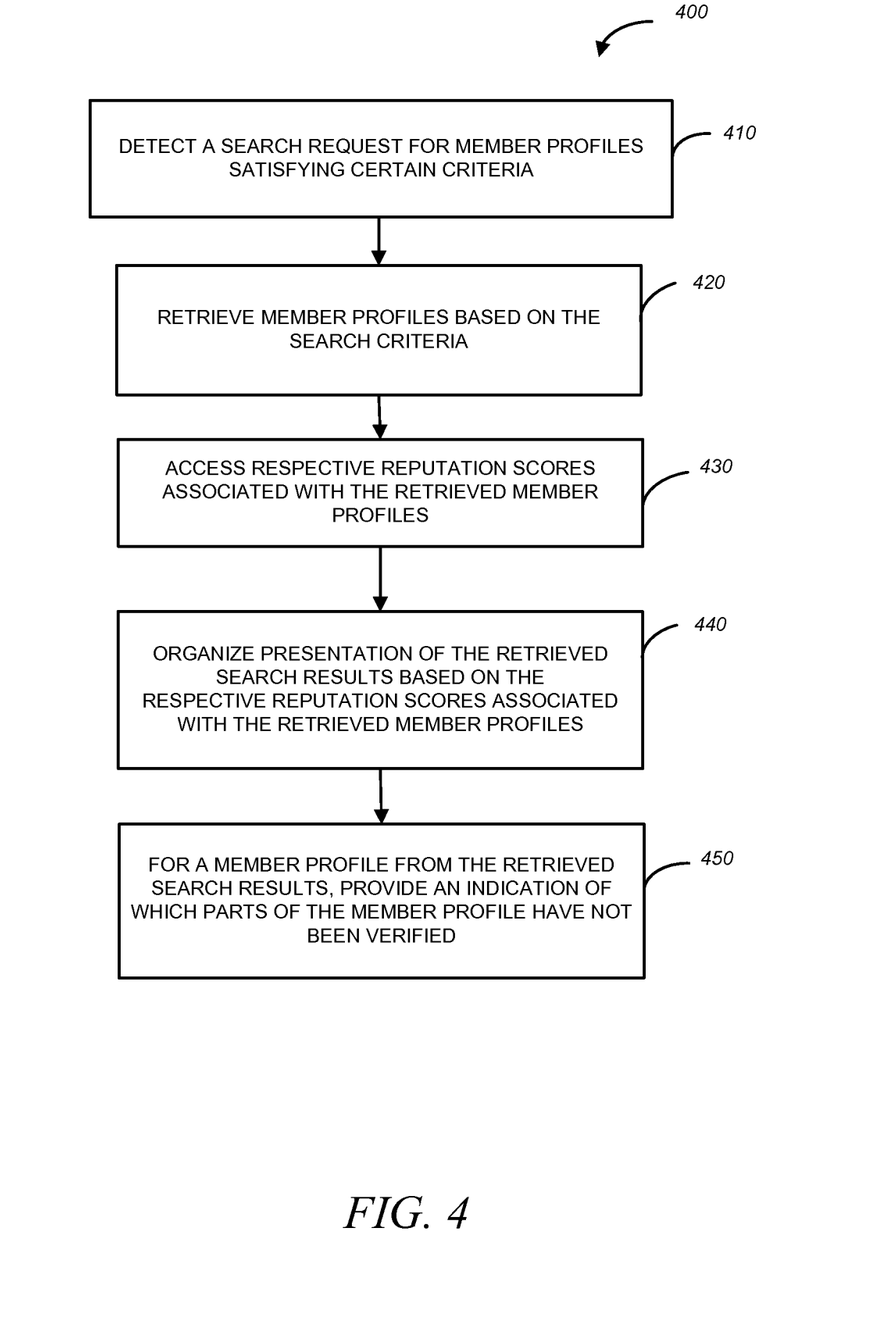
FIG. 4 is a flow chart of a method for utilizing reputation scores, in accordance with an example embodiment.

FIG. 4 is a flow chart of a method 400 for utilizing reputation scores, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1.

As shown in FIG. 4, the method 400 commences at operation 410, detecting a search request for member profiles that satisfy certain criteria. Such a request may be received, e.g., from a recruiter product searching for member profiles representing members having certain skills and certain level of expertise. The profiles satisfying the criteria are retrieved at operation 420. At operation 430, respective reputation scored of the retrieved profiled are accessed and examined and, at operation 440, the presentation of the retrieved search results are organized based on the respective reputation scores and, in some embodiments based on eth associated confidence values. For example, the profiles with greater reputations scores and with greater confidence values may be presents closer to the top of the list of the search results. A member profile presented in the search results may also be presented with an indication of which parts of the member profile have not been verified by the reputation scoring system (operation 450).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 5:
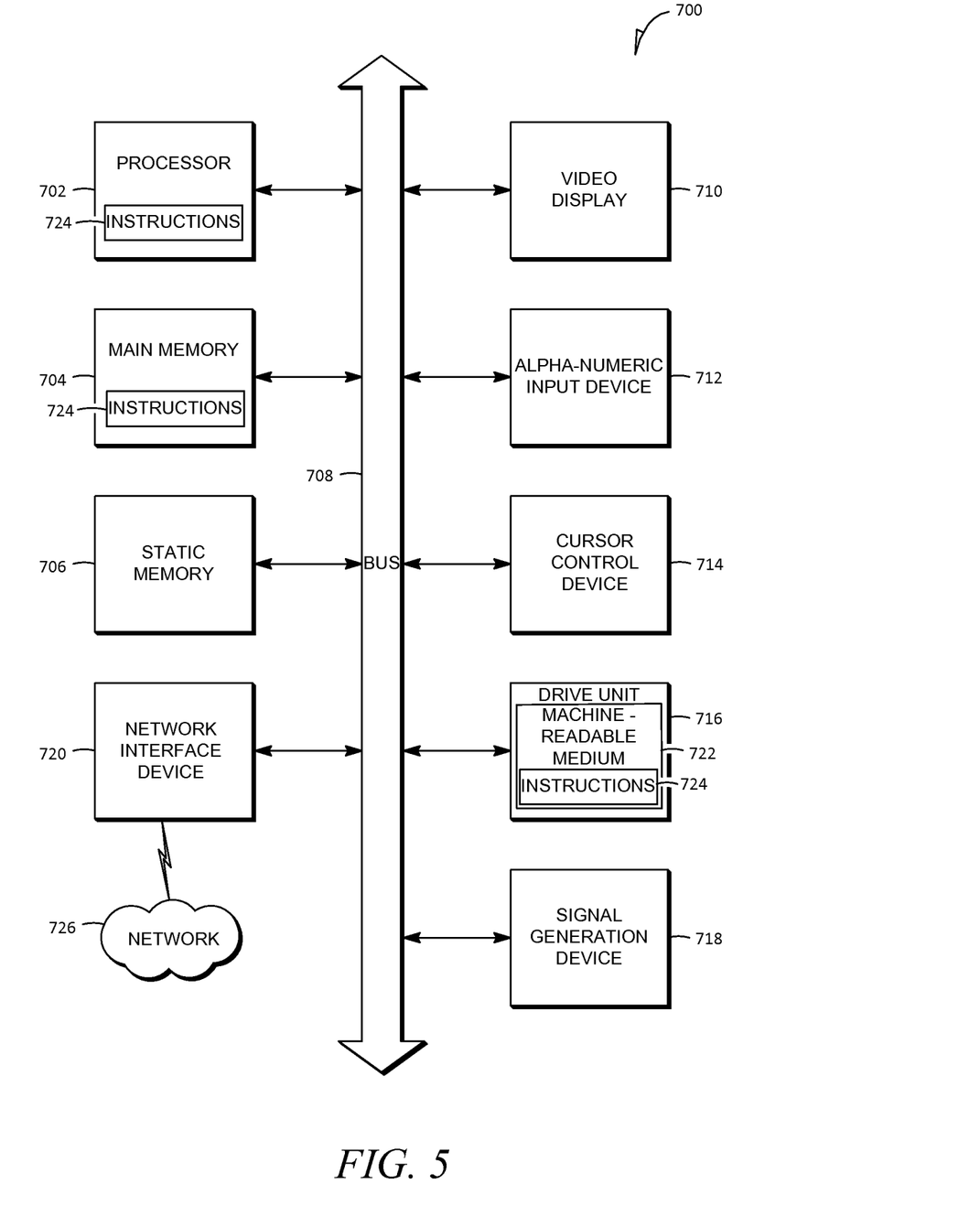
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to provide reputation scores for a social network member has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    accessing a member profile from member profiles in an on-line social networking system, the member profile representing a first member of the on-line social networking system, the member profile comprising a plurality of profile units;
    selecting a seed profile from the member profiles, the seed profile representing a second member of an on-line social network, a reputation score of the seed profile is associated with a confidence value that is above a predetermined threshold, the reputation score of the seed profile indicative of a reputation of the second member of the on-line social networking system;
    determining association information, the association information reflecting association between the member profile and the seed profile;
    for one or more profile units from the member profile, generating respective unit scores; and
    based on the respective unit scores for the one or more profile units and the association information, generating, using at least one processor, a combined reputation score, the combined reputation score being indicative of a reputation of the first member of the on-line social networking system.

2. The method of claim 1, wherein the association information is associated with a further profile, the further profile representing a third member of an on-line social network the further profile and the seed profile sharing a connection link in the on-line social networking system.

3. The method of claim 2, wherein the association information is associated with an activity in the on-line social networking system directed to the member profile and associated with the seed profile.

4. The method of claim 3, where in the activity is a direct activity, the direct activity being performed from the seed profile and affecting the member profile.

5. The method of claim 3, where in the activity is an indirect activity, the indirect activity being performed from the further profile and affecting the member profile.

6. The method of claim 1, further comprising generating a confidence value for the combined reputation score, the confidence value reflecting results of verifying verifiable information from the member profile.

7. The method of claim 1, further comprising normalizing the combined reputation score across profiles from the on-line social networking system.

8. The method of claim 1, comprising making the combined reputation score available, via a network, to one or more other members of the on-line social networking system.

9. The method of claim 1, further comprising generating a recommendation to update the member profile and communicating the recommendation to the first member.

10. A computer-implemented system comprising:
    at least one processor coupled to a memory;
    an access module to access, using the at least one processor, a member profile from member profiles in an on-line social networking system, the member profile representing a first member of the on-line social networking system, the member profile comprising a plurality of profile units;
    a seeding module to select, using the at least one processor, a seed profile from the member profiles, the seed profile representing a second member of an on-line social network, a reputation score of the seed profile is associated with a confidence value that is above a predetermined threshold, the reputation score of the seed profile indicative of a reputation of the second member of the on-line social networking system;
    an association information detector to determine association information, the association information reflecting association between the member profile and the seed profile;
    a unit score generator to generate, using the at least one processor, respective unit scores for one or more profile units from the member profile; and
    a combined reputation score generator to generate, using the at least one processor, a combined reputation score based on the respective unit scores for the one or more profile units and the association information, the combined reputation score being indicative of a reputation of the member of the on-line social networking system.

11. The system of claim 10, wherein the association information is associated with a further profile, the further profile representing a third member of an on-line social network the further profile and the seed profile sharing a connection link in the on-line social networking system.

12. The system of claim 11, wherein the association information is associated with an activity in the on-line social networking system directed to the member profile and associated with the seed profile.

13. The system of claim 12, where in the activity is a direct activity, the direct activity being performed from the seed profile and affecting the member profile.

14. The system of claim 12, where in the activity is an indirect activity, the indirect activity being performed from the further profile and affecting the member profile.

15. The system of claim 10, further comprising a confidence value generator to generate, using the at least one processor, a confidence value for the combined reputation score, the confidence value reflecting results of verifying verifiable information from the member profile.

16. The system of claim 10, further comprising a normalizing module to normalize, using the at least one processor, the combined reputation score across profiles from the on-line social networking system.

17. The system of claim 10, further comprising a recommendation module to generate, using the at least one processor, a recommendation to update the member profile and communicating the recommendation to the first member.

18. A machine-readable non-transitory storage medium having instruction data to cause a machine to:
    access a member profile from member profiles in an on-line social networking system, the member profile representing a first member of the on-line social networking system, the member profile comprising a plurality of profile units;
    select, using at least one processor, a seed profile from the member profiles, the seed profile representing a second member of an on-line social network, a reputation score of the seed profile is associated with a confidence value that is above a predetermined threshold, the reputation score of the seed profile indicative of a reputation of the second member of the on-line social networking system;

determine association information, the association information reflecting association between the member profile and the seed profile;
generate respective unit scores for one or more profile units from the member profile; and
generate a combined reputation score based on the respective unit scores for the one or more profile units and the association information, the combined reputation score being indicative of a reputation of the member of the on-line social networking system.

* * * * *